United States Patent
Chen

(10) Patent No.: US 10,959,128 B2
(45) Date of Patent: Mar. 23, 2021

(54) BLUETOOTH LOW ENERGY CONNECTED ISOCHRONOUS STREAM ACKNOWLEDGEMENT AND FLUSH ALGORITHM AND IMPLEMENTATION

(71) Applicant: Arm Limited, Cambridge (GB)

(72) Inventor: Jiawei Chen, San Diego, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/270,894

(22) Filed: Feb. 8, 2019

(65) Prior Publication Data
US 2020/0260322 A1  Aug. 13, 2020

(51) Int. Cl.
*H04W 28/04* (2009.01)
*H04W 84/18* (2009.01)

(52) U.S. Cl.
CPC .......... *H04W 28/04* (2013.01); *H04W 84/18* (2013.01)

(58) Field of Classification Search
CPC .............................. H04W 28/04; H04W 84/18
See application file for complete search history.

(56) References Cited

U.S. PATENT DOCUMENTS

| 9,798,530 B2 | 10/2017 | Hillyard |
| 2017/0026905 A1 | 1/2017 | DenBoer et al. |
| 2017/0303076 A1* | 10/2017 | Song ..................... H04L 1/1607 |
| 2019/0045304 A1* | 2/2019 | Bhalla ..................... H04R 3/12 |
| 2019/0045557 A1* | 2/2019 | Ouyang ................. H04W 4/80 |

* cited by examiner

*Primary Examiner* — Jae Y Lee
(74) *Attorney, Agent, or Firm* — Leveque IP Law, P.C.

(57) ABSTRACT

A method, system and computer program product for flushing packets between a master wireless communications device and a slave wireless communication device. The method includes linking a transmit (Tx) packet list and a receive (Rx) packet list at the master and slave wireless communications devices. A Tx data structure is generated for each of a plurality of anchor points and a Rx data structure is generated for each of the plurality of anchor points. Each Tx data structure is added to the Tx packet list, and each Rx data structure is added to the Rx packet list. A packet may then be flushed based on contents of the data structures.

18 Claims, 15 Drawing Sheets

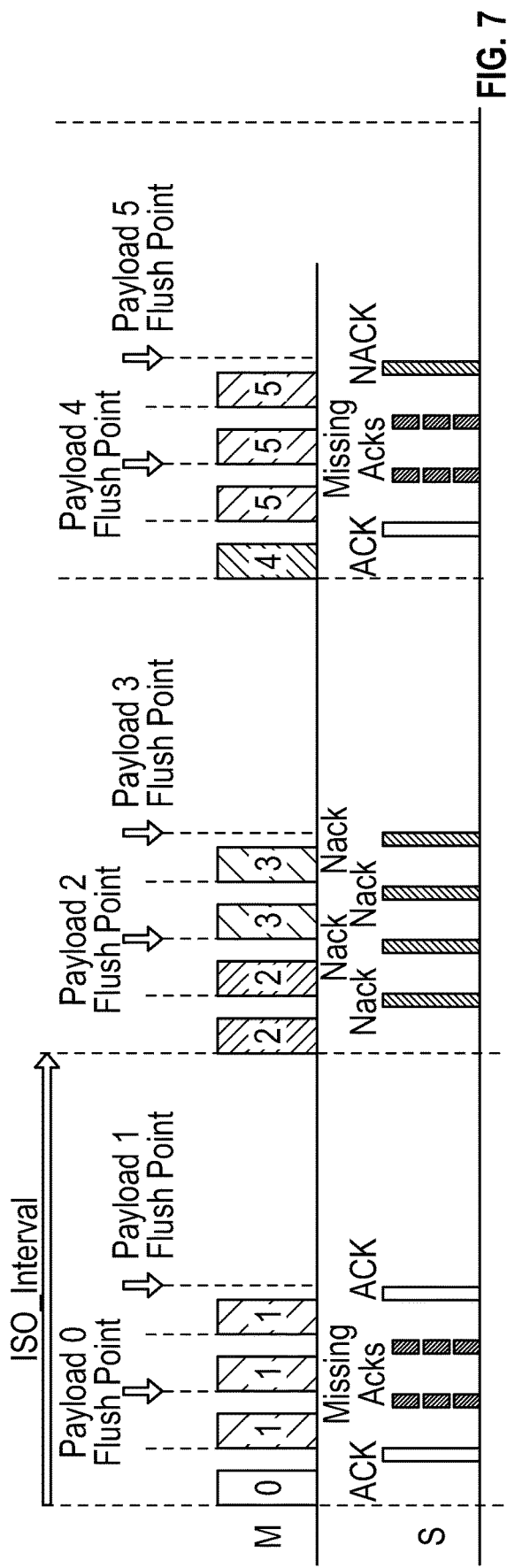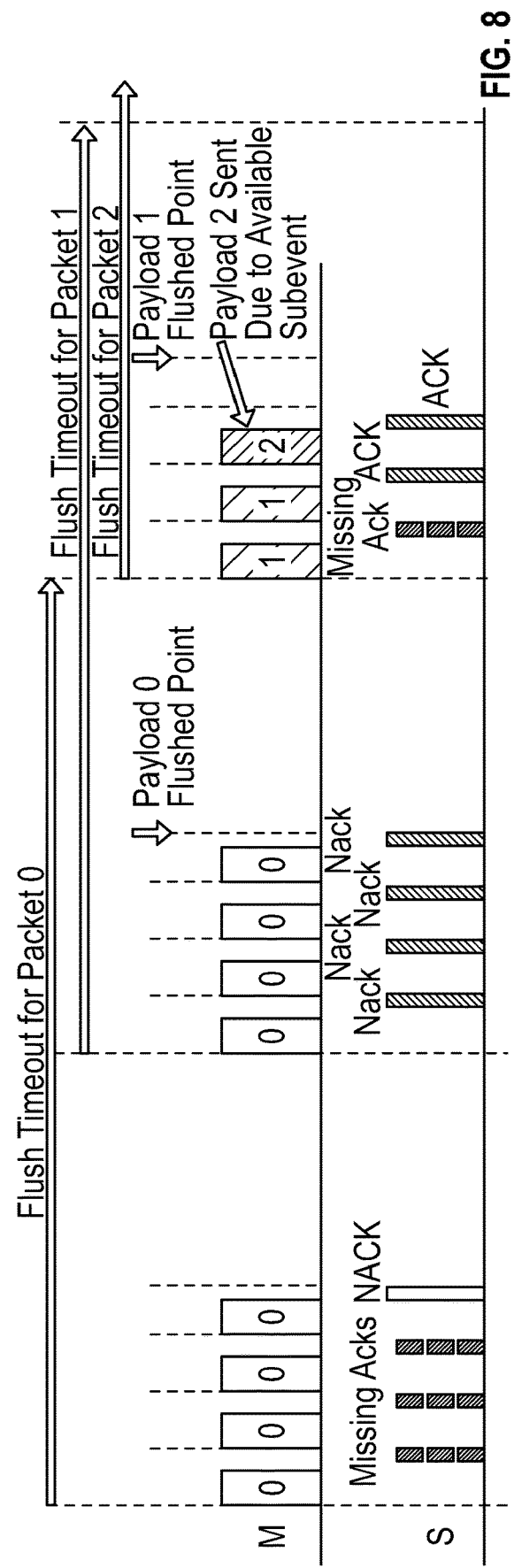

```
typedef struct
{
    bool_t  pduAcked;           /*!< TRUE if current PDU is acked, for Tx only.
*/
    bool_t  pduRcved;           /*!< TRUE if current PDU is received, for Rx
only. */
    uint8_t bn;                 /*!< Burst number for the flush timeout. */
    uint8_t pduCounter;         /*!< Current PDU counter in term of BN. */
    uint8_t subEvtCounter;      /*!< Current subevent counter before flush
timeout. */
    uint8_t intervalTotal;      /*!< Total number interval before flush
timeout. */
    uint8_t intervalCounter;    /*!< Current interval counter. */ uint8_t lastSubEvtFt[LCTR_MAX_BN];   /*!< Last subevent the PDU could be
transmitted before flush timeout for each PDU(in the last interval). */
    bool_t  isPduDone[LCTR_MAX_BN];      /*!< TRUE if the PDU is either acked or
flushed. */
    uint8_t pduType[LCTR_MAX_BN];        /*!< PDU type, whether NULL, empty or
non-empty. */

} lctrFtParam_t;
```

FIG. 18

BLUETOOTH LOW ENERGY CONNECTED ISOCHRONOUS STREAM ACKNOWLEDGEMENT AND FLUSH ALGORITHM AND IMPLEMENTATION

BACKGROUND

The present disclosure relates generally to short-range protocol wireless communications, and more particularly, for flushing packets in a Bluetooth® Low Energy (BLE) connected isochronous stream (CIS).

BLE is a wireless personal area network protocol that has a wide array of applications, such as for connecting electronic devices used in, for example, applications such as healthcare, fitness, beacons, home entertainment systems, and the like. Compared to a typical classic Bluetooth® classic device, BLE provides reduced power consumption and incurs lower cost while providing at least a similar, and often greater, communication range between connected devices. BLE radio operates in the unlicensed 2.4 GHz industrial, scientific, and medical radio band (ISM) band. The low energy (LE) system employs a frequency hopping transceiver to combat interference and fading and provides a plurality of frequency hopping spread spectrum (FHSS) carriers. LE radio operation utilizes a shaped, binary frequency modulation, to minimize transceiver complexity. LE uses terminology that differs from basic rate/enhanced data rate (BR/EDR) and alternate mac/physical (AMP/PHY) to describe supported PHYs with regard to differences in modulation, applied coding, and the resulting data rates. The mandatory symbol rate is 1 mega symbol per second (Msym/s), where 1 symbol represents 1 bit, consequently supporting a bit rate of 1 megabit per second (Mb/s). This is referred to as the LE 1M PHY. The 1 Msym/s symbol rate may optionally support error correction coding, which is characterized as the LE Coded PHY. This implementation may use either of two coding schemes: S=2, where 2 symbols represent 1 bit and support a bit rate of 500 kb/s, and S=8, where 8 symbols represent 1 bit and support a bit rate of 125 kb/s. An optional symbol rate of 2 Msym/s may also be supported, with a bit rate of 2 Mb/s, which is referred to as the LE 2M PHY. The 2 Msym/s symbol rate supports uncoded data only. LE 1M and LE 2M are collectively referred to as the LE Uncoded PHYs.

LE employs two multiple access schemes: Frequency division multiple access (FDMA) and time division multiple access (TDMA). Forty (40) physical channels, separated by 2 MHz, are used in the FDMA scheme. Three (3) channels are used as primary advertising channels, and 37 are employed as secondary advertising channels, data channels and connected isochronous channels. A TDMA based polling scheme is used in which one device transmits a packet at a predetermined time and a corresponding device responds with a packet after a predetermined interval.

In accordance with the present disclosure, there is provided an improved scheme for flushing packets in an CIS.

BRIEF DESCRIPTION OF THE DRAWINGS

The present disclosure is illustrated by way of example and not limited in the accompanying figures in which like reference numerals indicate similar elements and in which:

FIG. 7 is a timing diagram of flush points of CIS data packet data units (PDUs);

FIG. 8 is a timing diagram of the flush points in accordance with an embodiment of the disclosure;

FIG. 18 is a data structure for a flush timeout parameter.

DETAILED DESCRIPTION

Figure 1:
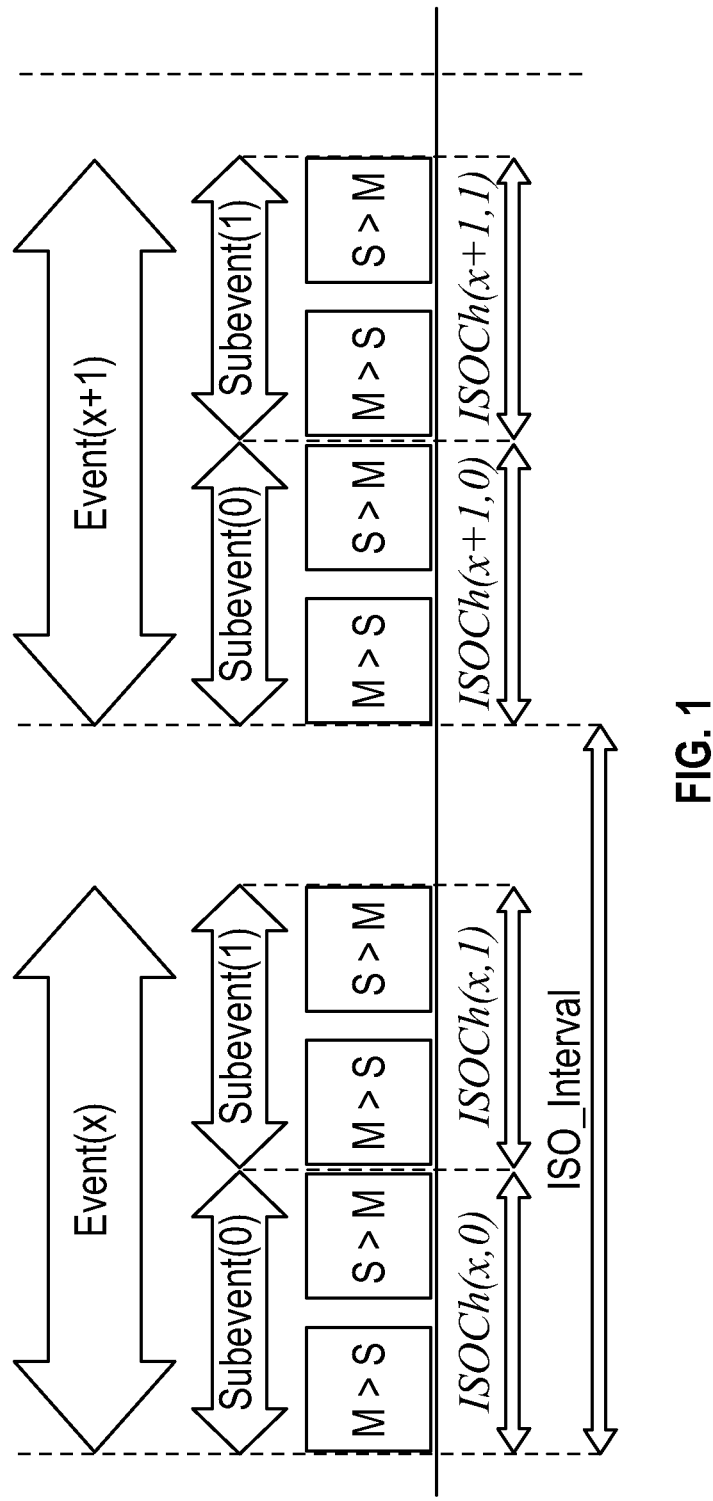
FIG. 1 is a timing diagram illustrating CIS events that occur every isochronous interval, where each CIS event consists of one or more subevents.

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

In accordance with one embodiment of the present disclosure, there is provided a method of flushing packets between a master wireless communications device and a slave wireless communication device. The method includes linking a transmit (Tx) packet list and a receive (Rx) packet list at the master and slave wireless communications devices. A Tx data structure is generated for each of a plurality of anchor points and a Rx data structure is generated for each of the plurality of anchor points. Each Tx data structure is added to the Tx packet list, and each Rx data structure is added to the Rx packet list. A packet may then be flushed based on contents of the data structures.

In accordance with a further embodiment, the content of the data structure includes one or more of a burst number and a sub-event counter.

In accordance with another embodiment, after each receiving operation at one of the master and slave wireless communications devices, the method determines whether to flush a packet based on a packet acknowledgment and removes one or more of the Tx and Rx data structure from a respective packet list.

In accordance with yet another embodiment, where after a defined number of intervals, the method further determines whether to flush a packet after expiry of a flush-out timer after each interval and removes one or more of the Tx and Rx data structure from a respective packet list.

In accordance with still another embodiment, the master and slave wireless communications devices communicate via a short-range wireless communications protocol low-energy connected isochronous stream (CIS).

In accordance with yet another embodiment, the short-range wireless communications protocol is Bluetooth®.

In accordance with a further embodiment, there is provided a system including a master wireless communication device; a slave wireless communication device connected to the master wireless communications device; and one or more processors coupled to non-transitory memory storing machine executable program instructions that when executed by the one or more processors, cause the master wireless communications device and the slave wireless communications devices to: link a transmit (Tx) packet list and a receive (Rx) packet list at the master and slave wireless communications devices; generate a Tx data structure for each of a plurality of anchor points; generate a Rx data structure for each of the plurality of anchor points; add each Tx data structure to the Tx packet list, and adding each Rx data structure to the Rx packet list; and flush a packet based on contents of the data structures.

In accordance with still another embodiment, there is provided a computer program product for flushing packets between a master wireless communications device and a slave wireless communication device. The computer program product includes a non-transitory memory medium, the memory medium containing machine executable program instructions executable by one or more processors, where the program instructions include: program code, which when executed by the more or processors, causes the one or more processors to link a transmit (Tx) packet list and a receive (Rx) packet list at the master and slave electronic devices; program code, which when executed by the more or processors, causes the one or more processors to generate a Tx data structure for each of a plurality of anchor points; program code, which when executed by the more or processors, causes the one or more processors to generate a Rx data structure for each of the plurality of anchor points; program code, which when executed by the more or processors, causes the one or more processors to add each Tx data structure to the Tx packet list, and adding each Rx data structure to the Rx packet list; and program code, which when executed by the more or processors, causes the one or more processors to flush a packet based on contents of the data structures.

BLE defines four LE physical channels, each of which is optimized and utilized for a different purpose. The LE piconet physical channel is used for communication between connected devices and is associated with a specific piconet. The LE advertising physical channel is used for broadcasting advertisements to LE devices. These advertisements can be used to discover, connect, or send user data to scanner or initiator devices. The advertising periodic physical channel is used to send user data to scanner devices in periodic advertisements at a specified interval. The LE isochronous physical channel is used to transfer isochronous data between LE devices in an LE piconet or to transfer isochronous data between unconnected LE devices. Whenever the link layer is synchronized to the timing, frequency, and access address of a physical channel, it is said to be 'connected' on the data physical channel or 'synchronized' to the periodic physical channel or isochronous physical channel (whether or not it is actively involved in communications over the channel).

With reference to FIG. 1, there is shown a timing diagram of an Asynchronous Connection-Less (ACL) connection, where a master wireless communications device can establish an isochronous connection that uses the isochronous physical channel. An isochronous connection is used to transfer isochronous data between the master wireless communications device and a slave wireless communications device using an isochronous connection logical transport referred to as a Connected Isochronous Stream (CIS). A CIS consists of CIS events that occur every isochronous interval. Every CIS event consists of one or more subevents. In each subevent, the master transmits once, and the slave responds. If the master and slave have completed transferring the scheduled isochronous data in an isochronous interval, all other subevents in that interval will have no radio transmissions and the event is closed. Each subevent uses an RF channel which is determined using the channel selection algorithm. The RF channel used for a subevent is marked as ISO Ch(eventcounter, subeventcounter).

The LE isochronous physical channel is created for transferring isochronous data between LE devices. The LE isochronous physical channel is characterized by a pseudo-random sequence of PHY channels and by three additional parameters provided by a master wireless communications device. The first is the channel map that indicates the set of PHY channels used in the piconet. The second is a pseudo random number used as an index into the complete set of PHY channels. The third is the timing of the first data packet. In an isochronous connection, the timing of the first packet is provided in the Link Layer message sent by the master wireless communications device during the CIS establishment phase in the associated ACL connection. The LE isochronous physical channel is used to send isochronous data in isochronous events that occur at regular intervals. Each isochronous event is divided into one or more subevents. Each subevent corresponds to a different PHY channel. In any subevent, in an isochronous connection the master transmits a packet to a slave wireless communications device, which may respond with its own packet. The master wireless communications device controls the access to the LE isochronous physical channel. In every isochronous event, the master wireless communications device initiates its transmission at the start of the first subevent. Packets transmitted by the master wireless communications device are time-aligned with the start of every subevent. The LE isochronous physical channel uses the set of PHY channels that are set by the LE piconet physical channel. There are 37 PHY data channels. The master wireless communications device or the isochronous stream broadcaster can reduce this number through the channel map that indicates the used channels. When the channel selection algorithm selects an unused channel, the unused channel is replaced with an alternate from the set of used channels. The LE isochronous physical channel can use any LE PHY.

A Connected Isochronous Group (CIG) allows a master wireless communications device to set up one or more isochronous connections for transferring streams of isochronous data. Where more than one CIS exists within a CIG, their isochronous data may have a time correspondence at the application layer. The Link Layer enables synchronization of isochronous data at the application layer. A CIG consists of one or more CISs. The total number of CISs in a CIG is denoted by the parameter NumCIS. Each CIS is identified by the CIS number which represents the position order (i.e. transmission order) of the CIS in a CIG. The value of the CIS number is assigned sequentially in ascending order between 1 and NumCIS in the order in which they are enabled. The CIS_ID is independent of the CIS number. The master Host assigns an identifier denoted by the parameter CIG_ID to each CIG. The CIG_ID is sent to the slave Host through the Link Layer during the establishment of any CIS in the CIG.

A CIG event consists of one or more CIS events depending on the number of CISs in that CIG. CIG events occur periodically every isochronous interval. The CIG event starts at the start of the first subevent of the first scheduled CIS (i.e., CIS(1)) and ends at the end of the last subevent of the last scheduled CIS (i.e., CIS(NumCIS)) in an isochronous interval. The CIG anchor points occur at the same time as the anchor points of the first CIS in the CIG.

Figure 2:
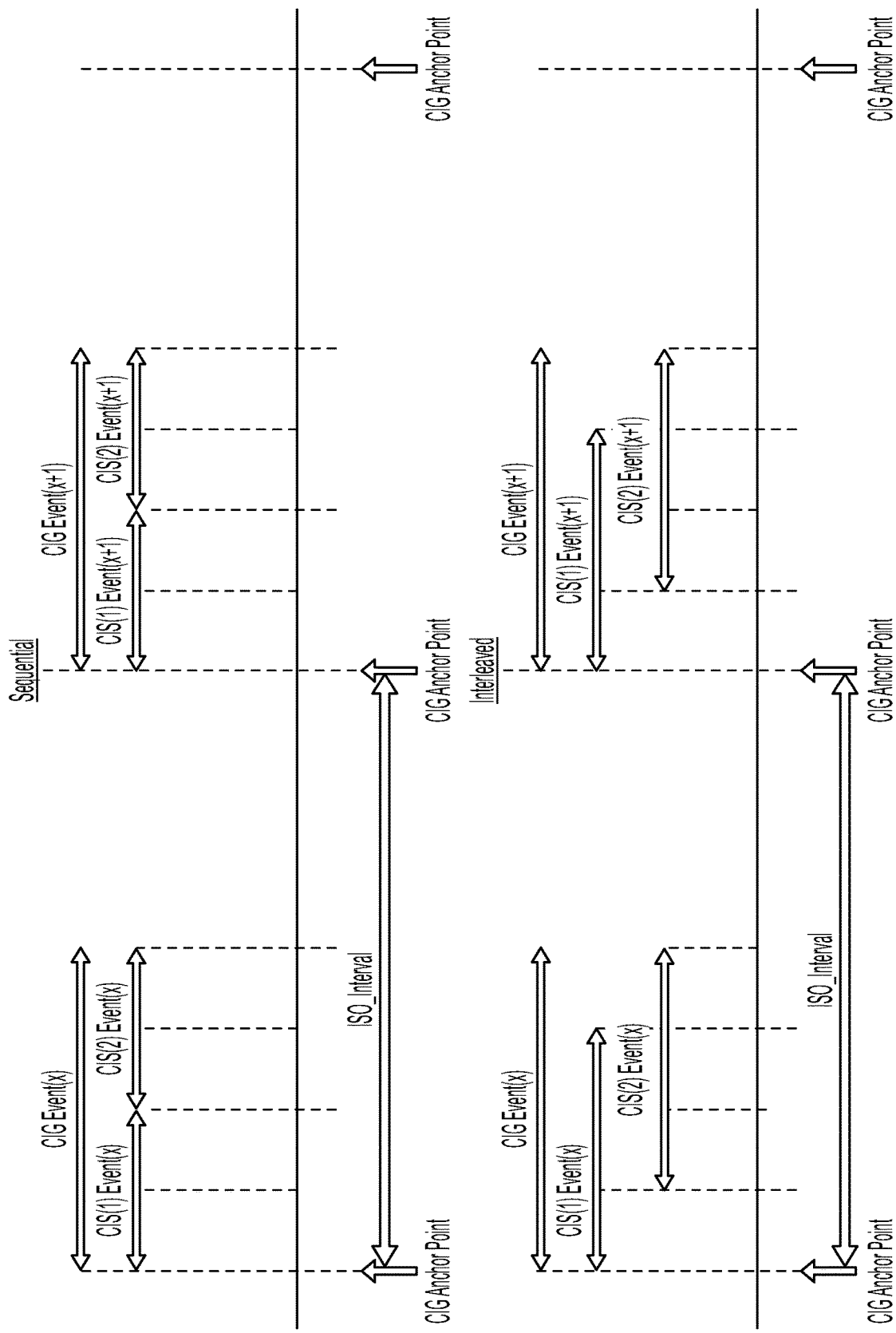
FIG. 2 is a timing diagram depicting a sequential and interleaved arrangement of CIS events of multiple overlapping CISs.

Multiple CISs in a CIG can be scheduled sequentially or in an interleaved arrangement. In the sequential arrangement, the CIS events are "back to back" which means CIS(2)'s event is immediately after CIS(1)'s event as shown in timing diagram of FIG. 2. In the interleaved arrangement the CIS events of multiple CISs are overlapping as shown in the drawing.

The CIS is a logical transport that enables the transfer of isochronous data between the master wireless communications device and slave wireless communications device. The LE-S or LE-F logical links are created when the Host enables a CIS in the controller. The isochronous data can be transferred either in an LE-S or LE-F logical link using the CIS logical transport. The isochronous data packets in the LE-S logical link may be fixed or variable size unframed CIS packet data units (PDUs). The isochronous data packets in the LE-F logical link may be fixed or variable size framed CIS Data PDUs.

A CIS supports variable size packets and transmission of one or more packets (i.e. a burst of packets denoted by the BN parameter) in an isochronous interval, allowing a range of data rates to be supported. Data traffic is unidirectional or bidirectional between a master and a slave. There is an acknowledgment protocol, which improves the reliability of delivering packets in a CIS. A CIS consists of one or more transmission periods denoted as subevents that occur every isochronous interval. To improve the reliability, the isochronous data packets can be re-transmitted by allocating more subevents than the number of packets scheduled to be transmitted in each interval. A CIS also supports a flushing mechanism, which allows a greater amount of time than one isochronous interval to deliver the payload. Every payload in a CIS has a flushing period defined by the fail parameter FT. By increasing the value of the FT, the reliability of delivering packets can be improved at the expense of higher latency.

A CIS can be established by a master using Link Layer signaling. An established CIS is also referred to an isochronous connection between the master wireless communications device and slave wireless communications device. The isochronous connection exists while the ACL connection used to establish the CIS exists. A master Link Layer assigns a unique access address to each isochronous connection. The host uses the SDU Interval, Max_SDU_Size, Transport_Latency and RTN parameters (known collectively as the Host parameters) to adjust the characteristics of a CIS. The Link Layer converts the host parameters to CIS parameters and schedules the transmission of CIS Data PDUs when the host enables the CIS in a controller. The conversion from Host parameters to CIS parameters and scheduling a CIS is implementation specific and an example of such a conversion is shown in Appendix B. The CIS parameters are ISO_Interval, Sub_Interval, NSE, BN, and FT. The master Host assigns an identifier to each CIS, denoted by the parameter CIS_ID. The CIS_ID is sent to the slave host through the Link Layer during the establishment of the CIS.

Figure 3:
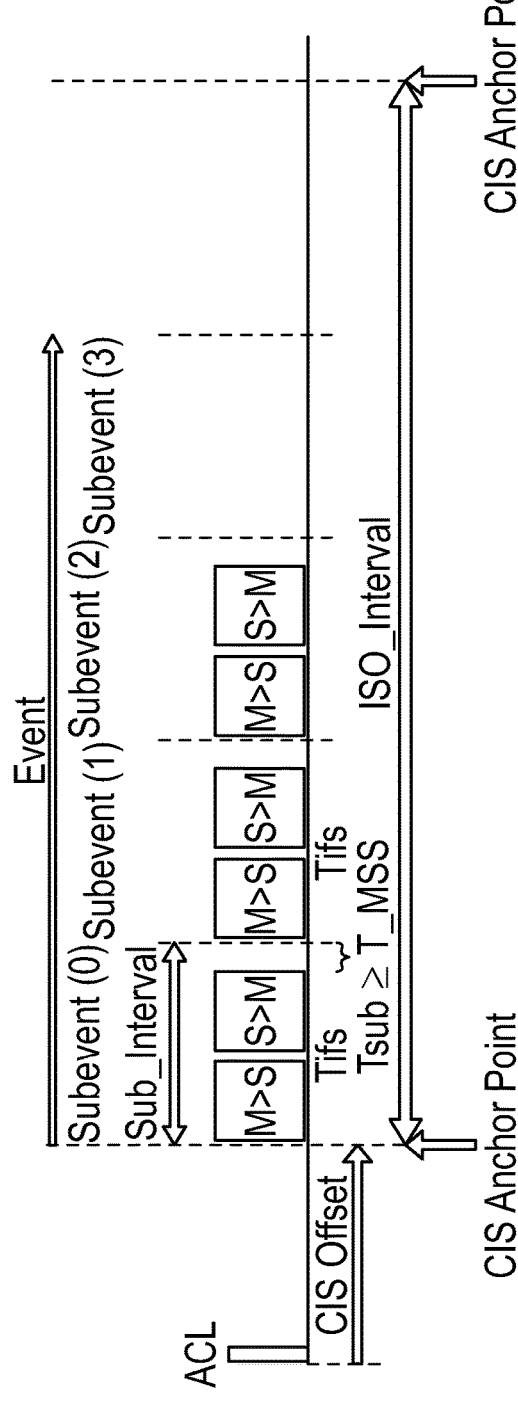
FIG. 3 is a timing diagram of an example CIS with four subevents used for transmission of a packet from the master to the slave and the response packet from the slave wireless communications device to the master wireless communications device.

A subevent is used for transmission of a packet from the master to the slave and the response packet from the slave wireless communications device to the master wireless communications device. With reference now to FIG. 3, there is shown an example CIS with NSE=4 showing CIS_offset, event and subevents is shown. The channel index for subevents is derived using a channel selection algorithm as described in co-pending U.S. patent application Ser. No. 16/270,691, filed on even date herewith and assigned to the assignee of the present application. The packet transmitted by the master wireless communications device or the slave wireless communications device is a CIS Data PDU or Null PDU. The master wireless communications device transmits a packet at the CIS anchor point (i.e. in the first subevent). Using the same channel index the slave wireless communications device may send a packet Time Inter Frame Space (T_IFS) after it receives a packet from the master wireless communications device, regardless of a valid cyclic redundancy check (CRC) match. The slave wireless communications device does not transmit if it fails to receive a packet from the master wireless communications device. The master wireless communications device and the slave wireless communications device may use the subsequent subevents for transmission or retransmission of packets. Multiple subevents within an isochronous interval occur every Sub_Interval, which is greater or equal to (Tx time of Max_Payload_Size PDU from master+T_IFS+Tx time of Max_Payload_Size PDU from slave+T_MSS). "T_MSS" is the minimum time interval between the end of the last bit of the last packet in one subevent and the start of the first bit of the first packet in the next subevent, which is designated and is 150 µs in accordance with the standard.

Figure 4:
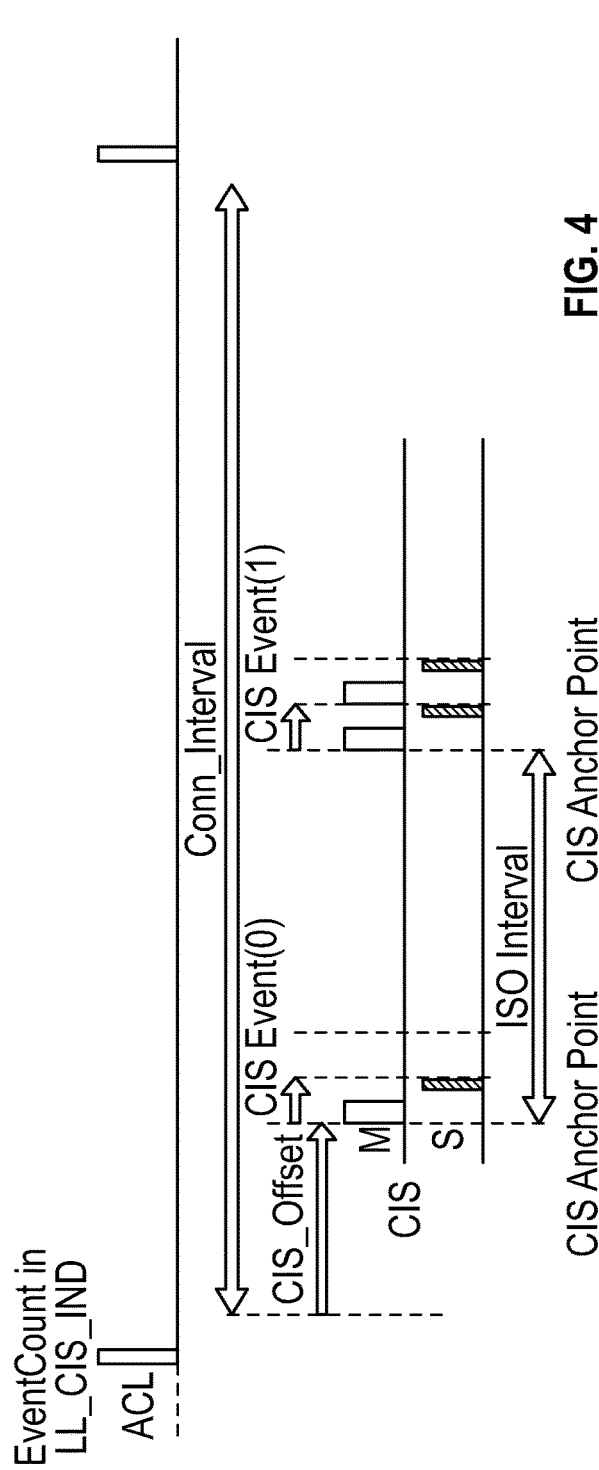
FIG. 4 is a timing diagram illustrating the start of a CIS from an Asynchronous Connection-Less (ACL) connection when directed by a Host.

The Link Layer in the Connection state when directed by the Host only transmits CIS PDUs in CIS events. CIS events in turn consist of CIS subevents in which the master and slave transfer CIS PDUs. Each CIS event normally contains at least one CIS PDU sent by the master. The master can, however, completely fail to transmit in a CIS event due to scheduling conflicts but transmits at least one CIS PDU within each CIS supervision timeout period. The start of a CIS event is called a CIS anchor point. The start of CIS events are spaced regularly with an interval ISO_Interval and don't overlap. The ISO_Interval is a multiple of 1.25 ms in the range of 5 ms to 4 s. The ISO_Interval is set by the master during scheduling of the CIS and sent to the slave during the CIS master establishment procedure. The first CIS anchor point is referenced in time from the CIS_Offset and the eventCount parameters sent in the LL_CIS_PDU sent in the ACL connection as shown in FIG. 4.

Figure 5:
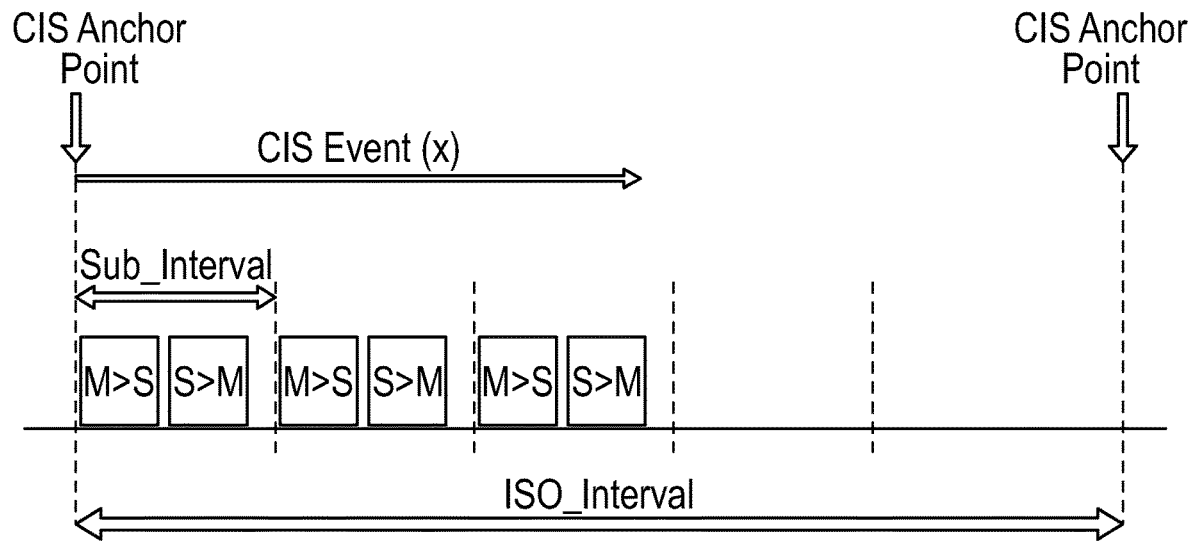
FIG. 5 is a timing diagram of a CIS event with a number of subevents (NSE)=4.

With reference to FIG. 5, there is depicted a timing diagram of a CIS event with NSE=4. Here, the CIS event starts at a CIS anchor point and ends at the end of the last transmission from the slave in the last subevent in an isochronous interval, or earlier when specified using the CIS bit. The CIS event ends when all scheduled payloads are transmitted, and the peer successfully acknowledged all the scheduled payloads as shown in the drawing. The minimum duration of a CIS event can be Sub_Interval−(time between packets (TIFS) and the maximum duration can be (NSE*Sub_Interval)−TIFS. The Link Layer schedules BN number of payload PDUs every ISO_Interval.

The Link Layer maintains a 16-bit event counter denoted as cisEventCount which is set to zero in the first CIS event. The cisEventCounter is incremented by one every CIS event. The start of every CIS event (i.e. the first subevent in the ISO_Interval) occurs on a physical channel index which is derived using the cisEventCount in the channel selection algorithm.

The Link Layer acknowledgment and flow control scheme is used in all ACL and isochronous connections. Unless specified otherwise, a PDU as characterized herein refers to either a Data Physical Channel PDU or CIS Data PDU. For each connection, the Link Layer has two parameters: (1) transmitSeqNum and (2) nextExpectedSeqNum, each of which consists of a single bit. The transmitSeqNum parameter is used to identify packets sent by the Link Layer. The nextExpectedSeqNum parameter is utilized by the Link Layer to either acknowledge the last PDU sent by the peer, or to request that the peer resend the last sent PDU. The transmitSeqNum and nextExpectedSeqNum parameters are set to zero upon entering the Connection State or when the isochronous connection gets established. A new PDU is a PDU sent for the first time by the Link Layer. A last PDU is a PDU that is resent by the Link Layer. When resending a Data Physical Channel PDU, the LLID, SN, and CP fields, the CTEInfo field (if present), and the payload of the sent Data Physical Channel PDU shall be equal to those of the last Data Physical Channel PDU sent by the Link Layer. When resending a CIS Data PDU, the LLID, SN, NPI fields, and the payload of the sent CIS Data PDU shall be equal to those of the last CIS Data PDU sent by the Link Layer. For each new PDU that is transmitted, the SN bit of the Header is set to transmitSeqNum. If a PDU is resent, then the SN bit remains unchanged. Upon reception of a PDU, the SN bit is compared to nextExpectedSeqNum. If the bits are different, then this indicates a resent PDU, and nextExpectedSeqNum is not changed. If the bits are the same, then this is a new PDU, and nextExpectedSeqNum is incremented by one. When a PDU is sent, the NESN bit of the Header is set to nextExpectedSeqNum. Upon receiving a PDU (including a Null PDU), if the NESN bit of that PDU is the same as transmitSeqNum, then the last sent PDU has not been acknowledged and is resent. If the NESN bit of the PDU is different from transmitSeqNum, then the last sent PDU has been acknowledged, transmitSeqNum is incremented by one, and a new PDU is sent.

Figure 6:
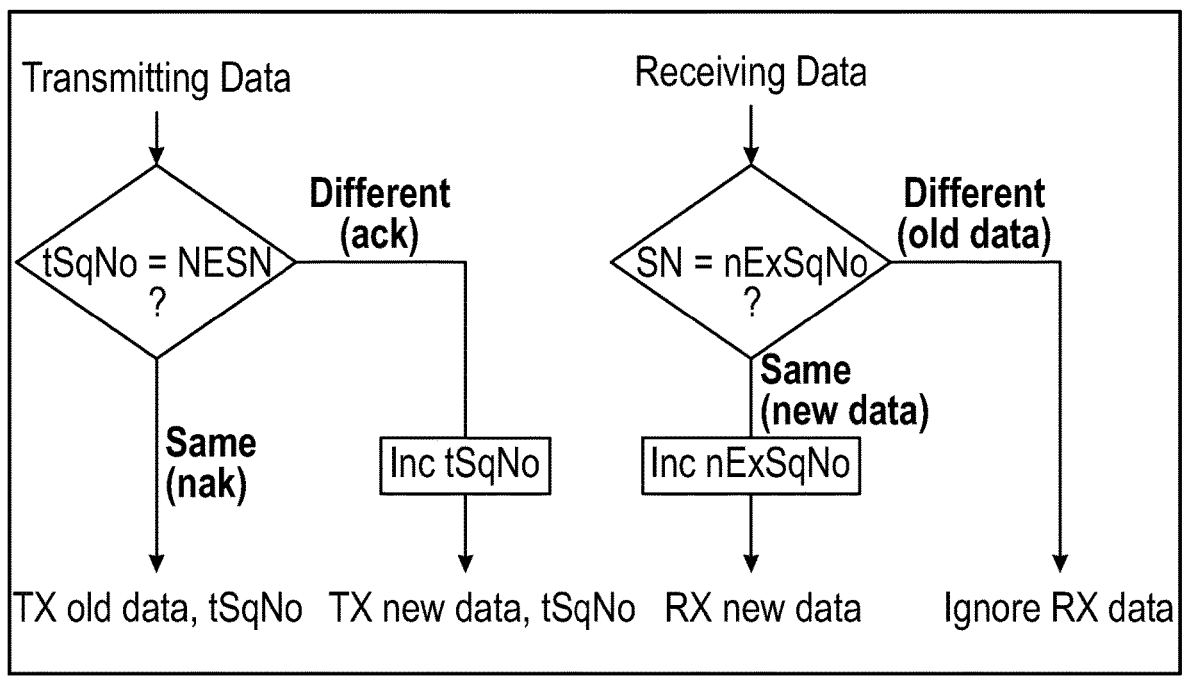
FIG. 6 is a Link Layer acknowledgment and flow control scheme used in ACL and isochronous connections.

The above described procedure is illustrated in FIG. 6. If a PDU is received with an invalid CRC match, nextExpectedSeqNum is not changed unless the PDU has reached a "flush timeout." In this regard, the PDU is not acknowledged, thereby causing the peer to resend the PDU. Since the received PDU has been rejected, the nextExpectedSeqNum from the peer device cannot be trusted, and therefore the last sent PDU from the transmitting device has not been acknowledged and must be retransmitted. Under this condition, TransmitSeqNum is not changed. The SN, NESN and MD bits are utilized from each received Data Physical Channel PDU that passes a cyclic redundancy check (CRC). Similarly, the SN, NESN, CIE and NPI bits are used from every received CIS Data PDU that has passed the CRC check, and the NESN, CIE and NPI bits are used from each received CIS Null PDU that has passed the CRC check. The PDU payload is ignored on each received PDU that has the same SN value as the previously received PDU. The SN value of a Null PDU is ignored upon reception. When the Link Layer transmitting a CIS Data PDU fails to either send that PDU or receive an acknowledgment for that PDU by the time the flush timeout occurs, the transmitSeqNum is incremented by one. When the Link Layer expecting to receive a CIS Data PDU either fails to receive that PDU or to acknowledge the PDU by the time the flush timeout occurs, the nextExpectedSeqNum is incremented by one.

With reference now to FIG. 7, there is depicted a timing diagram of flush points of CIS data PDUs. A Flush Timeout (FT) parameter is defined as the maximum number of ISO_Intervals over which a CIS Data PDU may be transmitted including all retransmissions. The Link Layer maintains a flush timer for each CIS Data PDU to be transmitted and for each CIS Data PDU to be received. The flush timer for a CIS Data PDU starts at the anchor point of an ISO_Interval in which the CIS Data PDU is scheduled to be transmitted or received for the first time. The flush timer expires at the end of one of the subevents in the last ISO_Interval of the flush timeout window and depends on the value of the BN. Every payload of the burst has a corresponding flush point after NSE−FLOOR(NSE/BN)*(BN−i) number of subevents, starting from the CIS anchor point in the last ISO_Interval of the flush timeout period, where i is the payload number in the burst of payloads and in the range 1 to BN, e.g., i=2 indicates the second payload in the burst, i=3 indicates the third payload in the burst, etc. As illustrated in FIG. 7, there is shows an example of the flush points of CIS Data PDUs with NSE=4, FT=1, BN=2. At the beginning of each interval, a Tx data structure is added to a Tx linked packet list (Txlist) and a Rx data structure is added to a Rx linked packet list (Rxlist). The transmitting Link Layer continues retransmitting an unacknowledged CIS Data PDU until the CIS Data PDU's flush point is passed, after which the CIS Data PDU shall be flushed. If the receiving Link Layer fails to receive a CIS Data PDU in the scheduled subevent or receives a CIS Data PDU with a CRC failure, then it continues to expect the same CIS Data PDU until the CIS Data PDU's flush point is reached, and then the Link Layer schedules receipt of the next expected CIS Data PDU. The Link Layer may use available subevents to transmit CIS Data PDUs queued in the transmit buffer. FIG. 8 is a timing diagram of the flush points in an implementation with a CIS having FT=2, BN=1, and NSE=4 and payload 0 is transmitted and re-transmitted until it is flushed. The payloads 1 and 2 are transmitted in the available subevents.

Figure 9:
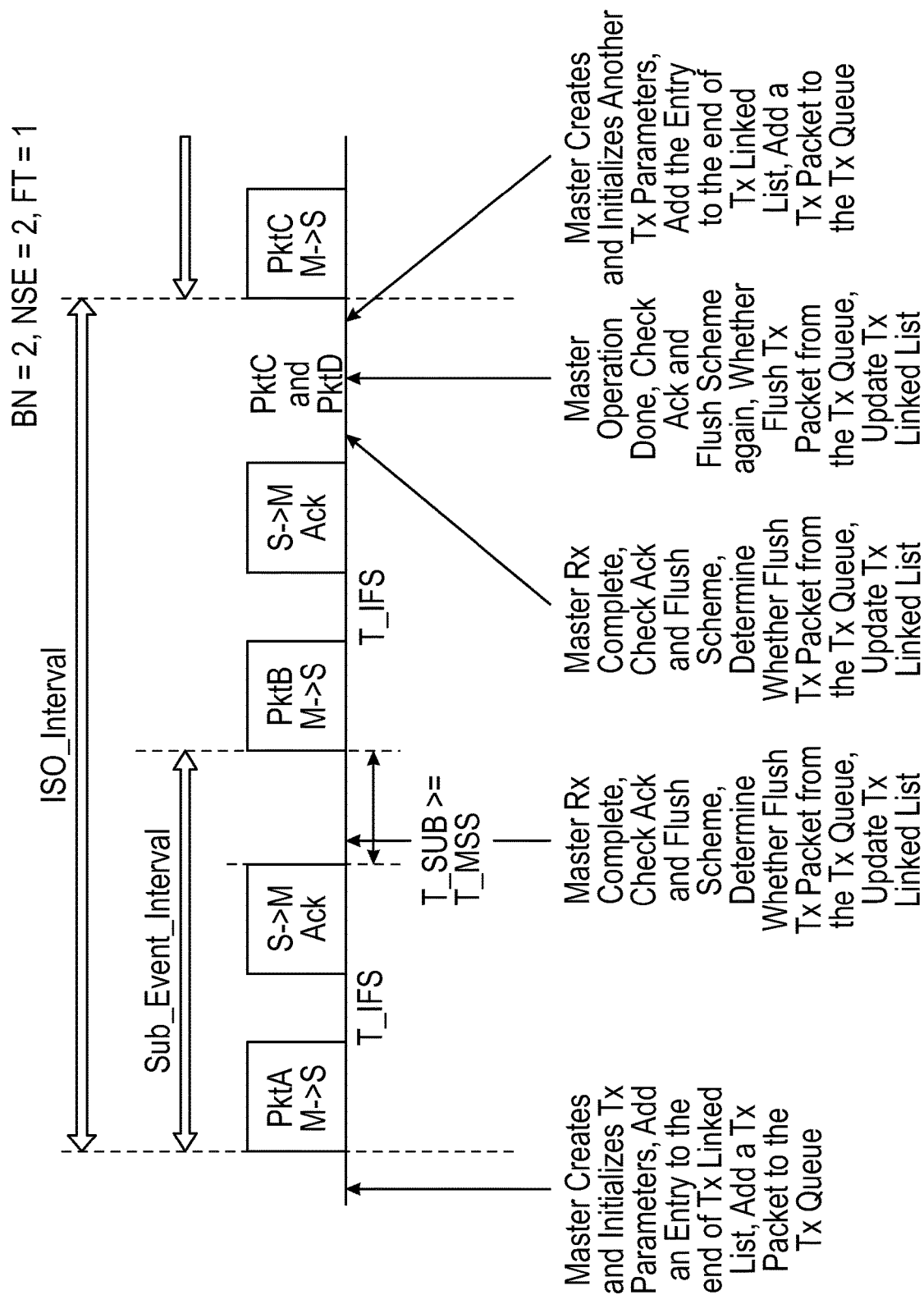
FIG. 9 is a timing diagram of a master wireless communications device Tx acknowledge and flush scheme in accordance with an embodiment of the disclosure.

Referring now to FIG. 9, there is illustrated a timing diagram of a master wireless communications device Tx acknowledge and flush scheme in accordance with an embodiment of the disclosure. For the purpose of description, the burst number is 2 (i.e., number of new packets to transmit for each ISO interval), NSE is 2 (i.e., number of subevents), and FT is 1 (i.e., flush timeout, number of iso intervals before the packet needs to be flushed). In the beginning of each master operation, there are two packets (pktA and pktB) in the Tx queue. A new ftParamA with data type ftParameter, is created as described further below. This ftParamA is added to the Tx flush timeout linked list (TxList). Then, the master wireless communications device starts transmitting with data of pktA. After some time (T_IFS), the master wireless communications device receives an acknowledgment from the slave wireless communications device. After each Rx, the master wireless communications device checks whether it needs to remove or flush the packet from the Tx queue, it updates parameters in ftparamA, and determines whether to remove ftparamA from the linked list. In this case, since the master wireless communications device receives an acknowledgment, it removes pktA from the Tx queue and, since there is more data to transmit, it keeps ftparamA in the linked list. Next, the master wireless communications device starts transmitting with data of pktB. After some time (T_IFS), the master wireless communications device receives an acknowledgment from the slave wireless communications device. Then master wireless communications device then checks whether it needs to remove or flush the packet from the Tx queue, it updates parameters in ftparamA, and determines whether to remove ftparamA from the linked list. In this case, since master receives an acknowledgment, it removes pktB from the Tx queue and, since there is no data to transmit, it removes ftparamA from the linked list. After the master operation is completed, in the last step it determines whether to flush the packet from the Tx queue, updates parameters in ftParamA, and further determines whether to remove ftparamA from the linked list. In this case, since both packets are already transmitted and acknowledged, no packet needs to be removed from the Tx queue, and further, since ftparamA is already removed from the linked list, the process stops. The master wireless communications device then repeats the entire process for the next operation with two new packets (pktC and pktD).

Figure 10:
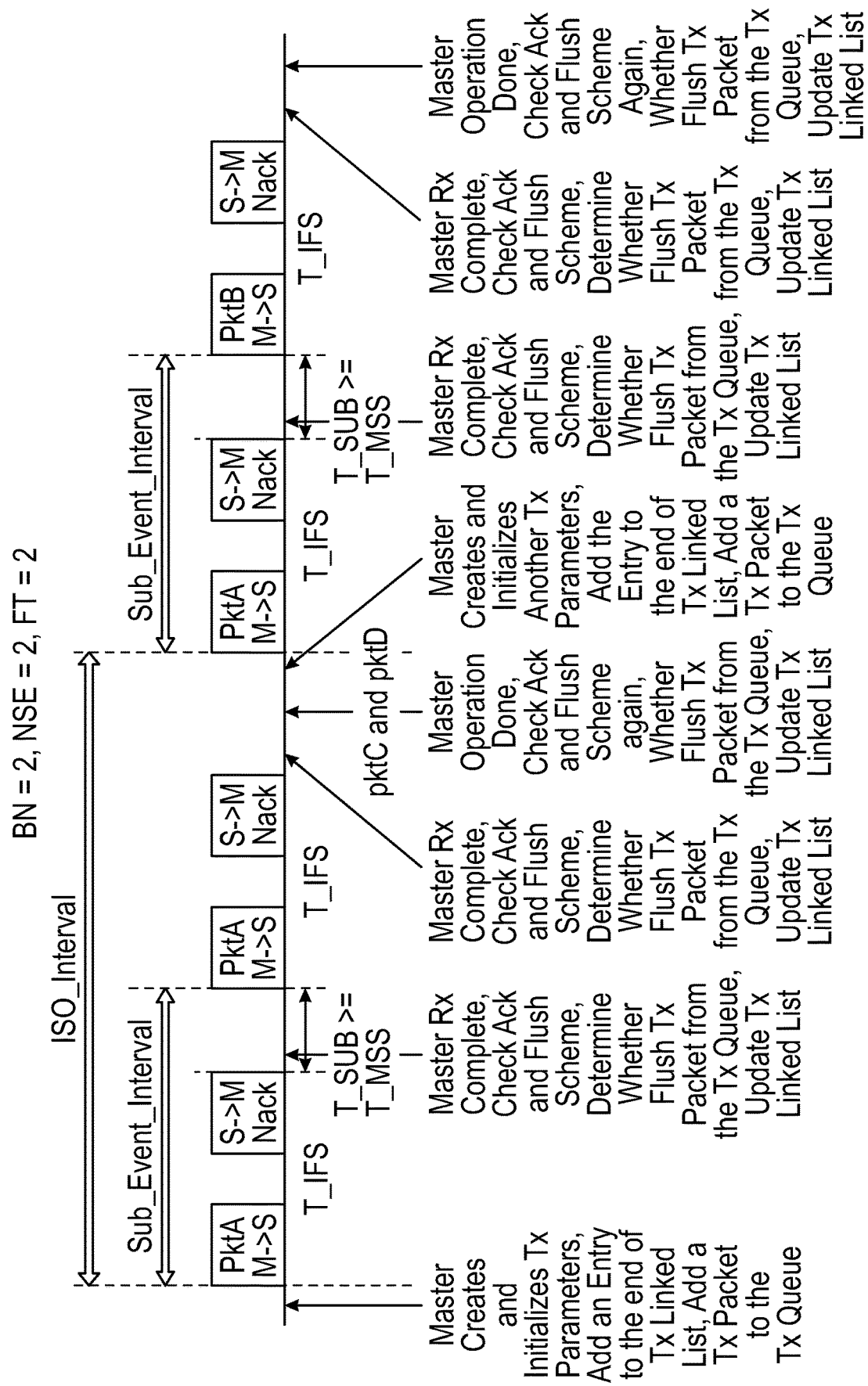
FIG. 10 is another timing diagram of a master wireless communications device Tx acknowledge and flush scheme in accordance with an embodiment of the disclosure.

Referring now to FIG. 10, there is depicted another timing diagram of another master wireless communications device Tx acknowledge and flush scheme in accordance with an embodiment of the disclosure. Here, the burst number is 2 (i.e., number of new packets to transmit for each ISO interval), NSE is 2 (i.e., number of subevent), and FT is 2 (i.e., flush timeout, number of ISO interval before the packet needs to be flushed). At the start of each master wireless communications device operation, it is assumed that there are two packets (pktA and pktB) in the Tx queue. A new ftParamA with data type ftParameter is created and initialized, and this ftParamA is added to the Tx flush timeout linked list (TxList). The master wireless communications device then starts transmitting with data of pktA. After a period of time (T_IFS), the master wireless communications device receives a non-acknowledgement (NACK) from the slave wireless communications device. Again, following each Rx, the master wireless communications device checks whether to remove or flush the packet from the Tx queue, updates parameters in ftparamA, and determines whether to remove ftparamA from the linked list. In this case, since the master wireless communications device receives a NACK and FT=2, it doesn't flush pktA from the Tx queue. As there is more data to transmit, the master wireless communications device keeps ftparamA in the linked list. Thereafter, the master wireless communications device again transmits with data of pktA. After a period of time (T_IFS), the master wireless communications device receives another NACK from the slave wireless communications device. Then master wireless communications device then checks whether to remove or flush the packet from the Tx queue, updates parameters in ftparamA, and determines whether to remove ftparamA from the linked list. In this case, since the master wireless communications device receives a NACK and FT=2, it doesn't flush pktA or pktB from the Tx queue. When there is more data to transmit and FT=2, it keeps ftparamA in the linked list. After the entire master operation terminates, the master wireless communications device determines whether to remove or flush the packet from the Tx queue, updates parameters in ftparamA, and further determines whether to remove ftparamA from the linked list. In this case, since both packets are NACK and FT=2, no packet needs to be flushed from the Tx queue and ftparamA is also kept. Before the next master operation, the master creates and initializes another ftParamB to the linked list. In the next master wireless communications device operation, the master still transmits with pktA. When it receives another NACK from the slave wireless communications device, it flushes pktA in accordance with the flush algorithm described herein. The master wireless communications device keeps ftparamA in the linked list and then transmits pktB in the next subevent. When the master wireless communications device receives a NACK from the slave wireless communications device, it flushes pktB from the Tx queue, and removes ftParamA from the linked list. The master wireless communications device then determines whether to flush the packet from the Tx queue and update parameters in the linked list. In this case, there is no need to flush more packets and no parameter entry will be removed from linked list. Prior to initiating the next master operation, the master wireless communications device adds another parameter entry (ftParamC) to the linked list. It then transmits pktC. This same process is thereafter repeated.

Figure 11:
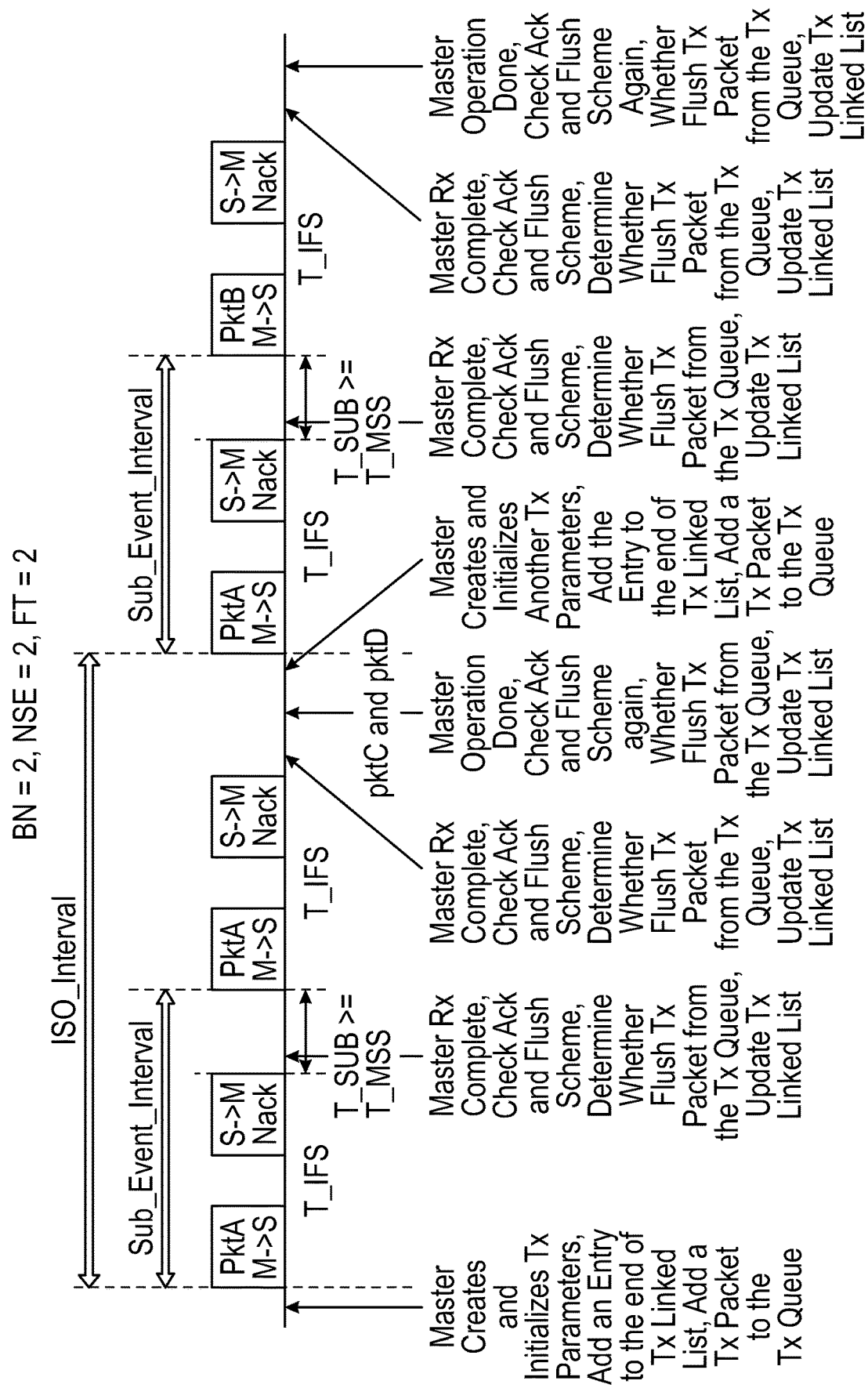
FIG. 11 is a timing diagram of a master wireless communications device Tx acknowledge and flush scheme in accordance with an embodiment of the disclosure.

Referring now to FIG. 11, there is illustrated a timing diagram of a master wireless communications device Tx acknowledge and flush scheme in accordance with an embodiment of the disclosure. In this example, the burst number=2, NSE=2, and FT=2. There are two packets (pktA and pktB) in the Tx queue. A new ftParamA with data type ftParameter are created and initialized, and ftParamA is added to the Tx flush timeout linked list (TxList). Then master wireless communications device starts transmitting with data of pktA, and after some time (T_IFS), master receives a nackfrom the slave wireless communications device. Again, after each Rx, the master wireless communications device checks whether to remove or flush the packet from the Tx queue, update parameters in ftparamA, and determine whether to remove ftparamA from the linked list. In this case, since the master wireless communications device receives a nack and since FT=2, it doesn't flush pktA from the Tx queue. Since there is more data to transmit, the master wireless communications device keeps ftparamA in the linked list. The master wireless communications device again starts transmitting with data of pktA, and after time (T_IFS), the master wireless communications device receives another nack from the slave wireless communications device. The master wireless communications device again then checks whether to remove or flush the packet from the tx queue. As before, it updates parameters in ftparamA, and determines whether to remove ftParamA from the linked list. In this case, since the master wireless communications device receives a nack and FT=2, it again doesn't flush pktB from the Tx queue. and since there is more data to transmit and FT=2, it keeps ftparamA in the linked list. After the entire master wireless communication device operation completes, it checks whether to remove or flush the packet from the Tx queue, updates parameters in ftparamA, and determines whether to remove ftparamA from the linked list. In this case, since both packets are both nack and FT=2, no packet is flushed from the Tx queue, and ftparamA is kept in the linked list. Prior to the next master wireless communication device operation, the master device creates, initializes and adds another ftParamB to the linked list. In the next master wireless communication device operation, the master device still transmits with pktA. When the master wireless communication device receives a subsequent nack from the slave wireless communication device, it flushes pktA according to the flush algorithm. The master wireless communication device still maintains ftparamA in the linked list. Thereafter, the master wireless communications device transmits pktB in the next subevent. The master wireless communication device then receives a nack from the slave wireless communication device, flushes pktB from the Tx queue, and removes ftparam from the linked list. After the entire master wireless device operation, the master device checks whether to flush the packet from the Tx queue, and updates the parameters in the linked list. In this case, there is no need to flush any more packets, and no parameter entry is removed from linked list. Prior to initiating the next master wireless communication device operation, the master device adds another parameter entry (ftParamC) to the linked list. It then begins transmitting pktC, and the same process is repeated for subsequent packets.

The master wireless communication device Rx acknowledge and flush scheme is similar to the master wireless communications device Tx acknowledge and flush scheme. Here, however, no packet needs to be flushed. The master wireless communications device only updates a Rx packet counter whenever a packet is received correctly or flushed. In this example, the master wireless communications device creates and initializes a new ftParamA, and inserts it at the end of the linked list. After the next Rx at the master wireless communications device, it implements the acknowledge and flush scheme to determine whether to update the Rx packet counter. It also determines whether to remove the parameter entry from the linked list. In this case, when a new packet is received, the Rx counter is incremented, and the parameter entry is maintained in the linked list.

Figure 12:
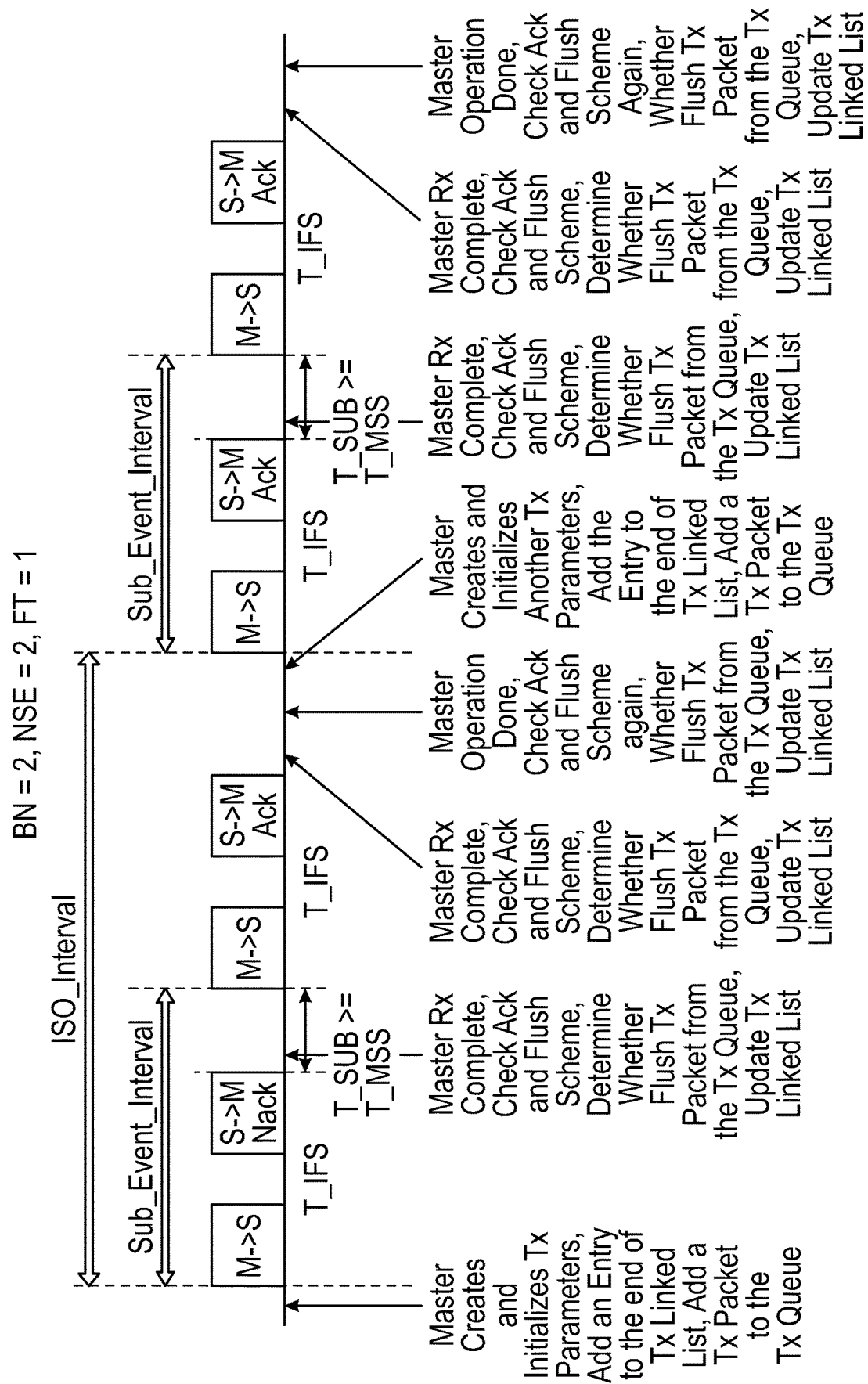
FIG. 12 is a timing diagram of a master wireless communications device Rx acknowledge and flush scheme in accordance with an embodiment of the disclosure.

Referring now to FIG. 12, there is depicted a timing diagram of a slave wireless communications device Rx acknowledgment and flush scheme in accordance with an embodiment of the disclosure. The slave wireless communications device Rx flush scheme differs from the master wireless communications device Tx acknowledge and flush scheme in that the slave wireless communications device receives, but doesn't transmit, data packets. In the example depicted in FIG. 12, the slave wireless communications device creates and initializes Rx parameters (ftParamA), and adds the entry to the end of the Rx linked list. For the purposes of this description, there are two packets (pktA, pktB) in the Tx queue. After the master wireless communications device finishes Tx, it determines whether to flush the packet and to update linked list. In this case, where the slave wireless communications device transmits a NACK, the master wireless communications device keeps pktA and doesn't change the entries in the linked list. The master wireless communications device then transmits pktA. Then slave wireless communications device transmits an ACK to the master wireless communications device. The master will implement the acknowledge and flush scheme to determine whether to flush the packet from the Tx queue and update the entries in the linked list. In this case, it removes the pktA from the Tx queue, and since there is still more data to transmit, it will not remove ftparamA from the linked list. The master wireless communications device then transmits pktB in its next transmit slot. After all the master wireless communications device operation is complete, it executes the acknowledge and flush scheme to determine whether to flush the packet from Tx queue and update the entries in the linked list. In this case, pktB is flushed and, since both two packets are either removed or flushed, ftParamA is also removed from the linked list. The slave wireless communications device then repeats the process for the next ISO interval.

Figure 13:
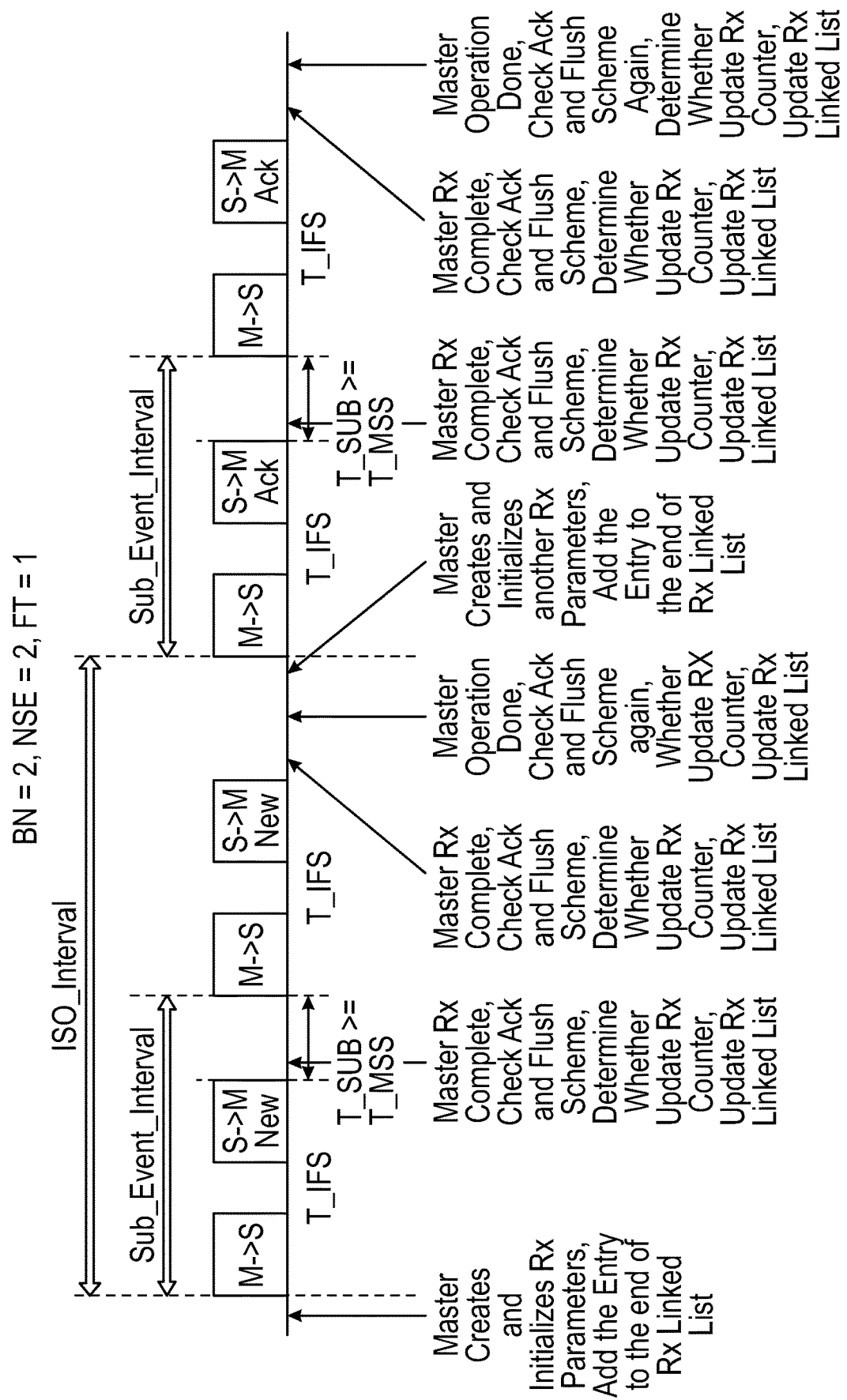
FIG. 13 is a timing diagram of a master wireless communications device Rx acknowledgment and flush scheme in accordance with an embodiment of the disclosure.

Referring now to FIG. 13, there is illustrated a timing diagram of a master wireless communication device Rx acknowledge and flush scheme in accordance with an embodiment of the disclosure. In this case, the master wireless communications device creates and initializes a new ftParamA and inserts into the end of the linked list. After the next master wireless communications device Rx, the master device uses the acknowledge and flush scheme to determine whether to update the Rx packet counter. It also determines whether to remove the parameter entry from the linked list. In this case, the master wireless communications device receives a new packet and increments the Rx counter. Since there is more data to receive, it keeps ftparamA in the linked list. After the master wireless communications device receives the next packet from the master wireless communications device, it again executes the acknowledge and flush scheme to determine whether to update the Rx packet counter. It also determines whether to remove the parameter entry from the linked list. In this case where a new packet is received, the Rx counter is incremented. And, since all packets are received, ftParamA is removed from the linked list. After the master operation is completed, it uses the acknowledge and flush scheme to determine whether to update the Rx packet counter. It also determines whether to remove the parameter entry from the linked list. In this case, all packets are received, the Rx counter is not changed. And since ftParamA has already been removed from the list, the process terminates.

Figure 14:
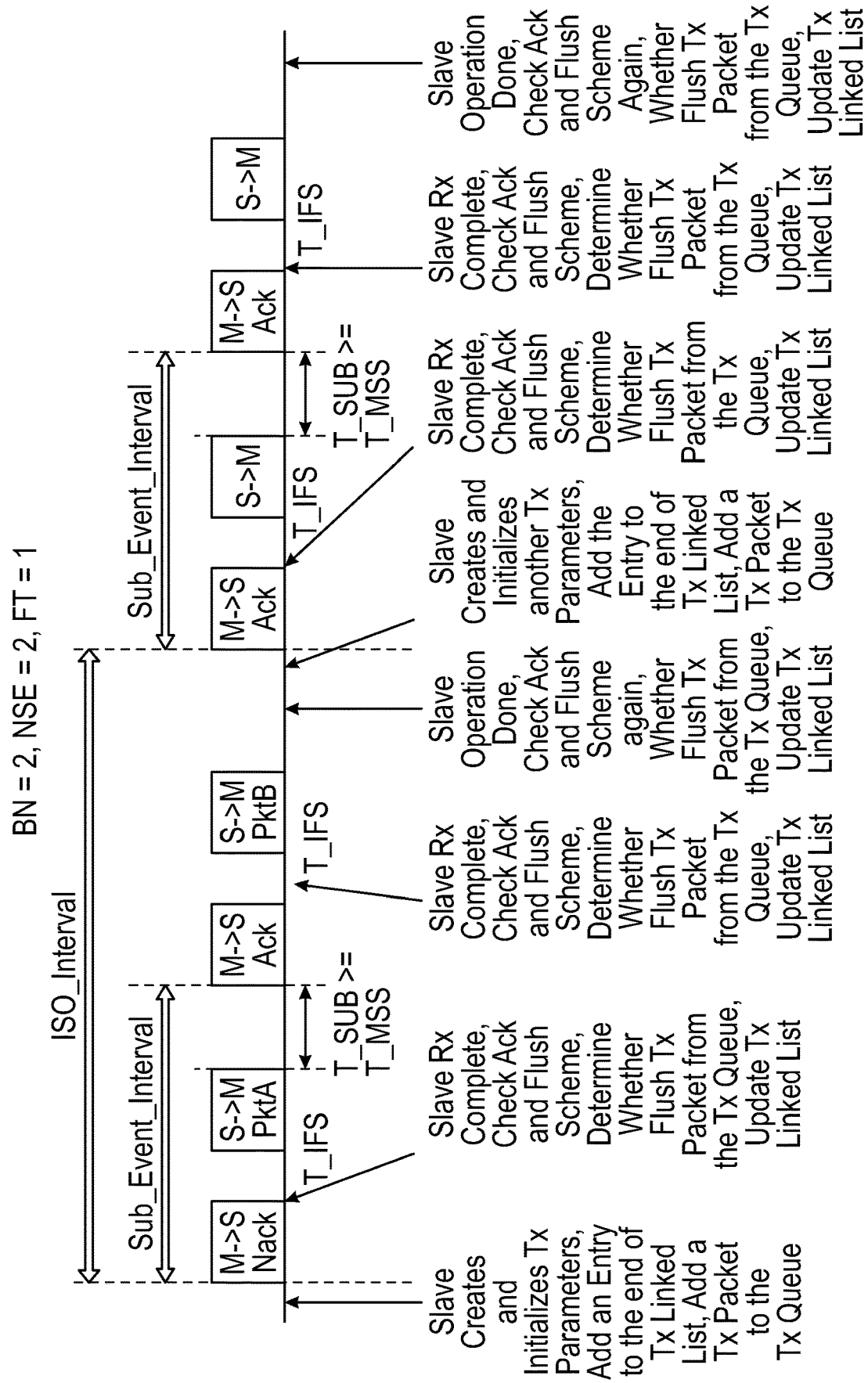
FIG. 14 is a timing diagram of a slave wireless communications device Tx acknowledge and flush scheme in accordance with an embodiment of the disclosure.

FIG. 14 is a timing diagram of a slave wireless communications device Tx acknowledge and flush scheme in accordance with an embodiment of the disclosure. The difference between the slave wireless communication device Tx and master wireless communication device Tx acknowledge and flush scheme described above, is that the slave wireless communication device transmits, as opposed to receives, data packets, and the master Rx in the first subevent of the current ISO interval is used to acknowledge receipt of the last packet sent in the previous ISO interval. In the example illustrated in FIG. 14, the slave wireless communication device creates and initializes Tx parameters (ftParamA) and adds the entry to the end of Tx linked list. Here again, in the sample embodiment, there are two packets (pktA, pktB) present in the Tx queue. After the slave wireless communication device finishes Rx, it checks whether to flush the packet and update linked list. In this case, where the slave wireless communication device receives a nack, the slave device keeps pktA and makes no changes to the entries in the linked list. Then slave wireless communication device then transmits data with pktA. The slave wireless communication device receives an ack from the master wireless communication device and executes the acknowledge and flush scheme to determine whether to flush the packet from Tx queue and update the entries in the linked list. In this case, it removes the pktA from the Tx queue and, since there is still more data to transmit, it maintains ftParamA in the linked list. Then slave wireless communication device then transmits pktB in its next transmit slot. After all the slave wireless communication device operation completes, the slave device uses the acknowledge and flush scheme to determine whether to flush the packet from Tx queue and update the entries in the linked list. In this case, pktB is flushed and, since both two packets are either removed or flushed, ftParamA is also removed from the linked list. Then slave wireless communication device repeats the entire process for the next ISO interval.

Figure 15:
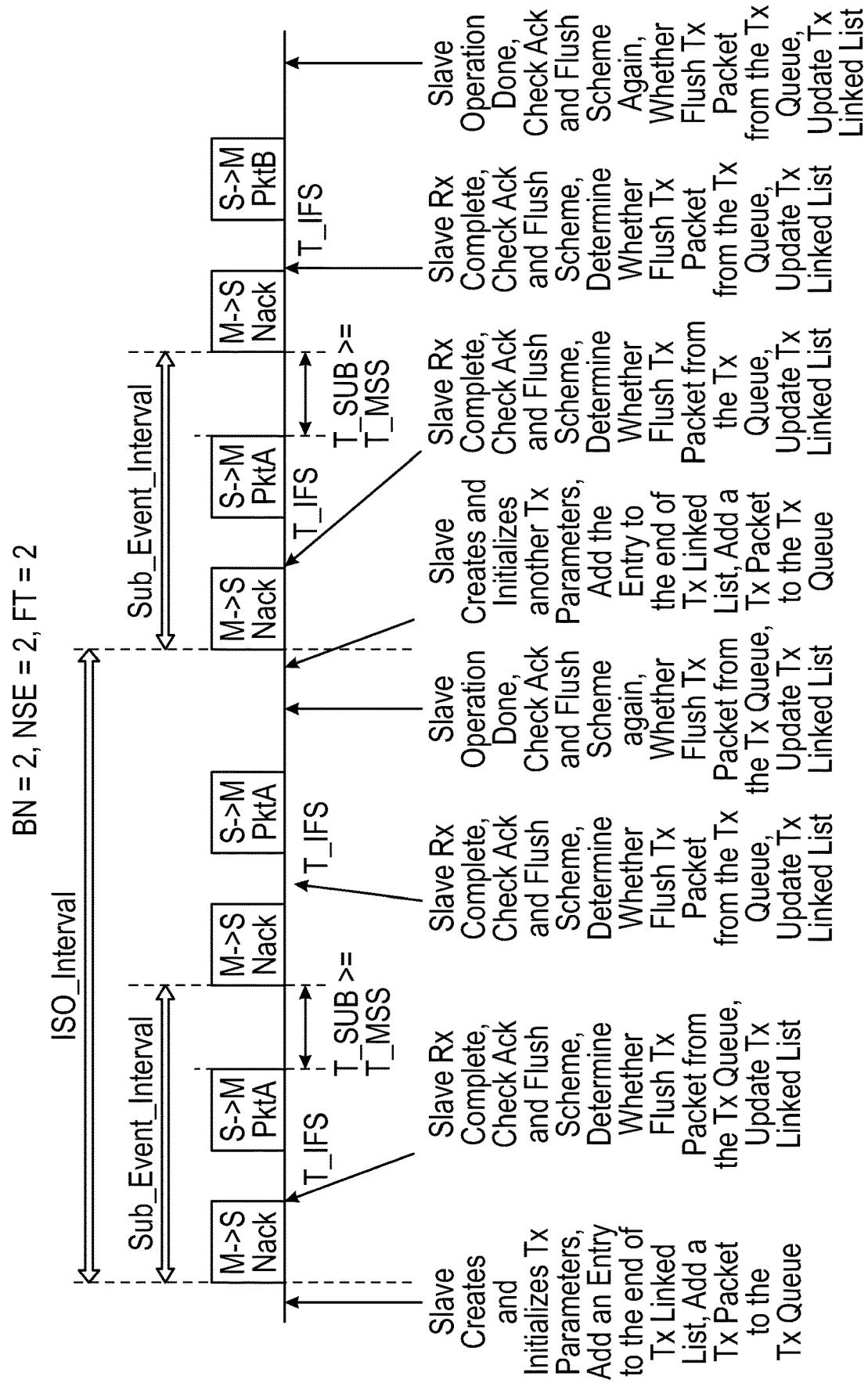
FIG. 15 is a timing diagram of a slave wireless communications device Tx acknowledge and flush scheme in accordance with an embodiment of the disclosure.

FIG. 15 is a timing diagram of a slave wireless communications device Tx acknowledge and flush scheme in accordance with an embodiment of the disclosure. Here, the slave wireless communication device receives only a nack from the master wireless communication device. Initially, the beginning slave creates and initializes flush timeout parameters (ftParamA), add the entry to the end of Tx linked list and at that time I assume there are two packets (pktA, pktB) in the Tx queue. After the slave wireless communication device finishes Rx, it checks whether to flush the packet and to update linked list. In this case, where the slave wireless communication device receives a nack, the slave device keeps pktA and makes no change to the entries in the linked list. Thereafter, the slave wireless communication device transmits data with pktA and receives another nack from the master wireless communication device. The slave wireless communication device then implements the acknowledge and flush scheme to determine whether to flush the packet from Tx queue and update the entries in the linked list. In this case, the slave wireless communication device keeps the pktA in the Tx queue and, since there is still more data to transmit, it keeps ftparamA in the linked list. Thereafter, the slave wireless communication device transmits pktA in its next transmit slot. After the slave wireless communication device operation is completed, it uses the acknowledge and flush scheme to determine whether to flush the packet from Tx queue and update the entries in the linked list. In this case, pktA is kept and there are no changes made to the linked list. Prior to the start of the next slave wireless communication device operation, the slave device creates and initializes another parameter entry (ftParamB) and adds it to the linked list. The slave wireless communication device is now ready to start Rx. After the slave wireless communication device receives a packet from the master wireless communication device, it checks whether to flush the packet and update linked list. In this case where the slave wireless communication device receives a nack, it keeps the pktA from the Tx queue and, since there is more data to transfer, it maintains ftparamA in the linked list. The slave wireless communication device then transmits pktA to the master wireless communication device. After the slave wireless communication device receives the next packet from the master wireless communication device, it checks whether to flush the packet and update linked list. In this case where the slave wireless communication deviced receives a nack, it flushes pktA from the Tx queue and keeps ftParamA in the linked list. Then slave wireless communication device then transmits pktB to the master wireless communication device. After the slave wireless communication device finishes this operation, it checks whether to flush the packet and update linked list. In this case, the slave wireless communication device flushes pktB from the Tx queue and removes ftParamA from the linked list, but ftParamB remains in the linked list. Then slave wireless communication device executes subsequent operations using the same methodology.

Figure 16:
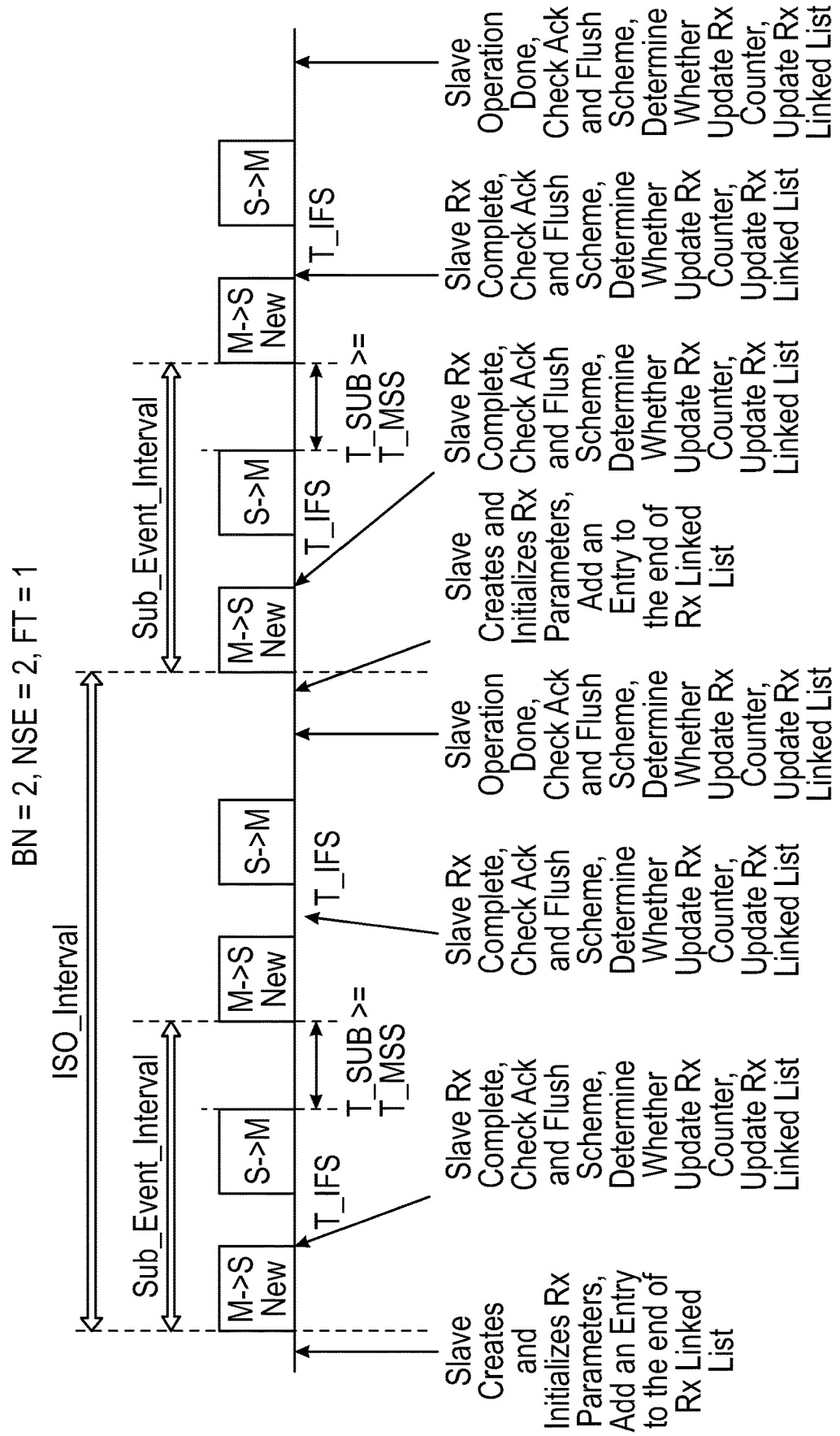
FIG. 16 is a timing diagram of a slave wireless communications device Rx acknowledge and flush scheme in accordance with an embodiment of the disclosure.

FIG. 16 is a timing diagram of a slave wireless communications device Rx acknowledge and flush scheme in accordance with an embodiment of the disclosure. Here, the slave wireless communication device creates and initializes a new ftParamA and adds it to the end of the linked list. After the slave wireless communication device receives a packet from the master wireless communication device, the slave device uses the acknowledge and flush scheme to determine whether to update the Rx packet counter. It also determines whether to remove the parameter entry from the linked list. In this case, where the slave wireless communication device receives a new packet, it increments the Rx counter. Since there is still more data to Rx, the slaved wireless communication device keeps ftParamA in the linked list. After the slave wireless communication device receives the next packet from the master wireless communication device, it implements the acknowledge and flush scheme to determine whether to update the Rx packet counter. It also determines whether to remove the parameter entry from the linked list. In this case, where a new packet is received, the Rx counter is incremented and, since all packets have been received, ftParamA is removed from the linked list. After the master wireless communication device is finished, it uses the acknowledge and flush scheme to determine whether to update the Rx packet counter. It also determines whether to remove the parameter entry from the linked list. In this case where all packets have been received, the Rx counter remains unchanged and since ftParamA has been previously removed from the linked list, the process terminates.

Figure 17:
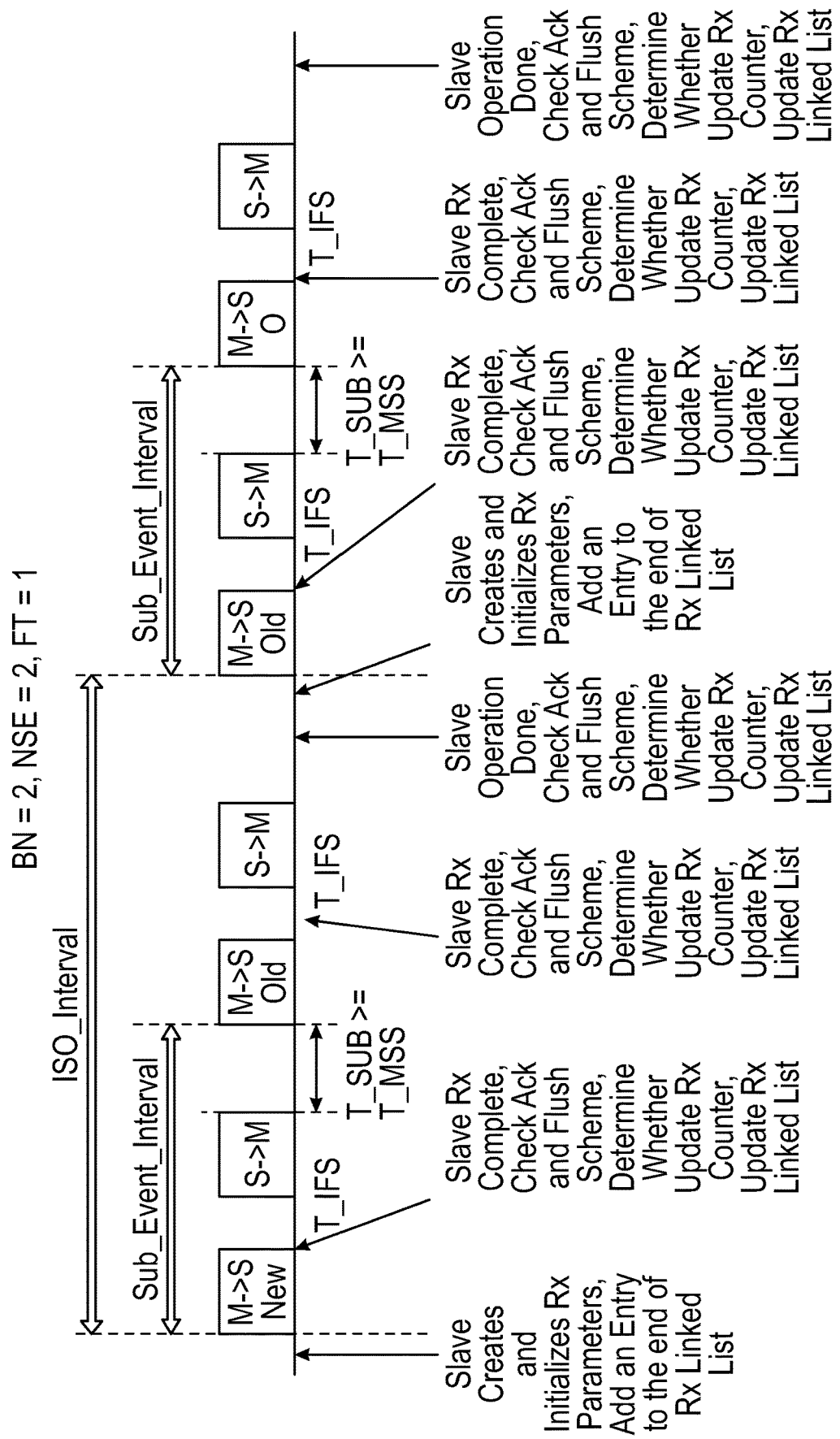
FIG. 17 is a timing diagram of a slave wireless communications device Rx acknowledge and flush scheme in accordance with an embodiment of the disclosure.

FIG. 17 is a timing diagram of a slave wireless communications device Rx acknowledge and flush scheme in accordance with an embodiment of the disclosure. Here, the slave wireless communication device creates and initializes a new ftParamA and adds it to the end of the linked list. After the slave wireless communication device receives a packet from the master wireless communication device, the slave device uses the acknowledge and flush scheme to determine whether to update the Rx packet counter. It also determines whether to remove the parameter entry from the linked list. In this case, where the slave wireless communication device receives a new packet, it increments the Rx counter. Since there is still more data to Rx, the slaved wireless communication device keeps ftParamA in the linked list. After slave receives the next packet from the master, it uses the acknowledge and flush scheme to determine whether update the Rx packet counter. It also determines whether to remove the parameter entry from the linked list. In this case, where an old packet is received, the Rx counter is not incremented, in accordance with the flush scheme. Since all packets have been received, ftParamA is removed from the linked list. After the slave wireless device operation is finished, the slave device uses the acknowledge and flush scheme to determine whether to update the Rx packet counter. It also determines whether to remove the parameter entry from the linked list. In this case, where all packets have been received, the Rx counter has been incremented. And, since ftParamA has already been removed from the linked list, the process terminates.

FIG. 18 is a representative data structure for the flush timeout parameter, ftParameter described above.

The terms "program," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "deriving" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

Accordingly, embodiments and features of the present disclosure are set out in the following numbered items:

1. A method of flushing packets between a master wireless communications device and a slave wireless communication device, including: linking a transmit (Tx) packet list and a receive (Rx) packet list at the master and slave wireless communications devices; generating a Tx data structure for each of a plurality of anchor points; generating a Rx data structure for each of the plurality of anchor points; adding each Tx data structure to the Tx packet list, and adding each Rx data structure to the Rx packet list; and flushing a packet based on contents of the data structures.

2. The method of flushing packets of item 1, where the content of the data structure includes one or more of a burst number and a sub-event counter.

3. The method of flushing packets of item 1, further including: after each receiving operation at one of the master and slave wireless communications devices, determining whether to flush a packet based on a packet acknowledgment; and removing one or more of the Tx and Rx data structure from a respective packet list.

4. The method of flushing packets of item 1, where after a defined number or intervals, the method further includes: determining whether to flush a packet after expiry of a flush-out timer after each interval; and removing one or more of the Tx and Rx data structure from a respective packet list.

5. The method of flushing packets of item 1, where the master and slave wireless communications devices communicate via a short-range wireless communications protocol low-energy connected isochronous stream (CIS).

6. The method of flushing packets of item 5, where the short-range wireless communications protocol is Bluetooth®.

7. A system including: a master wireless communication device; a slave wireless communication device connected to the master wireless communications device; and one or more processors coupled to non-transitory memory storing machine executable program instructions that when executed by the one or more processors, cause the master wireless communications device and the slave wireless communications devices to: link a transmit (Tx) packet list and a receive (Rx) packet list at the master and slave wireless communications devices; generate a Tx data structure for each of a plurality of anchor points; generate a Rx data structure for each of the plurality of anchor points; add each Tx data structure to the Tx packet list, and adding each Rx data structure to the Rx packet list; and flush a packet based on contents of the data structures.

8. The system for flushing packets of item 7, where the content of the data structure includes one or more of a burst number and a sub-event counter.

9. The system for flushing packets of item 7, where after each receiving operation at one of the master and slave wireless communications devices, the one or more processors are operable to determine whether to flush a packet based on a packet acknowledgment; and remove one or more of the Tx and Rx data structure from a respective packet list.

10. The system for flushing packets of item 7, where after a defined number or intervals, the one or more processors are operable to: determine whether to flush a packet after expiry of a flush-out timer after each interval; and remove one or more of the Tx and Rx data structure from a respective packet list.

The system for flushing packets of item 7, where the master and slave wireless communications devices communicate via a short-range wireless communications protocol low-energy connected isochronous stream (CIS).

12. The system for flushing packets of item 11, where the short-range wireless communications protocol is Bluetooth®.

13. A computer program product for flushing packets between a master wireless communications device and a slave wireless communication device, the computer program product including: a non-transitory memory medium, the memory medium containing machine executable program instructions executable by one or more processors, the program instructions including: program code, which when executed by the more or processors, causes the one or more processors to link a transmit (Tx) packet list and a receive (Rx) packet list at the master and slave electronic devices; program code, which when executed by the more or processors, causes the one or more processors to generate a Tx data structure for each of a plurality of anchor points; program code, which when executed by the more or processors, causes the one or more processors to generate a Rx data structure for each of the plurality of anchor points; program code, which when executed by the more or processors, causes the one or more processors to add each Tx data structure to the Tx packet list, and adding each Rx data structure to the Rx packet list; and program code, which when executed by the more or processors, causes the one or more processors to flush a packet based on contents of the data structures.

14. The computer program product for flushing packets of item 12, where the content of the data structure includes one or more of a burst number and a sub-event counter.

15. The computer program product for flushing packets of item 12, where, after each receiving operation at one of the master and slave wireless communications devices, the program code causes the one or more processors to: determine whether to flush a packet based on a packet acknowledgment; and remove one or more of the Tx and Rx data structure from a respective packet list.

16. The computer program product for flushing packets of item 12, where after a defined number or intervals, the program code causes the one or more processors to: determine whether to flush a packet after expiry of a flush-out timer after each interval; and remove one or more of the Tx and Rx data structure from a respective packet list.

17. The computer program product of item 12, where the master and slave wireless communications devices communicate via a short-range wireless communications protocol low-energy connected isochronous stream (CIS).

18. The system for flushing packets of item 17, where the short-range wireless communications protocol is Bluetooth®.

In accordance with the foregoing, a method, system and computer program product for flushing packets is disclosed. Having thus described the disclosure of the present application in detail and by reference to embodiments thereof, it will be apparent that modifications and variations are possible without departing from the scope defined in the appended claims as follows:

The invention claimed is:

1. A method of flushing packets between a master wireless communications device and a slave wireless communication device, comprising:
   responsive to a packet in a packet queue, and prior to an anchor point, generating a data structure of the anchor point, the data structure having at least one flush timeout parameter;
   adding the data structure to a linked list of data structures; and
   responsive to a receiving operation at at least one of the master and slave wireless communications devices, flushing a packet based at least in part on a content of at least one data structure in the linked list of data structures.

2. The method of flushing packets of claim 1, where the content of the at least one data structure includes one or more of a burst number and a sub-event counter.

3. The method of flushing packets of claim 1, further comprising:
   after the receiving operation at at least one of the master and slave wireless communications devices, determining whether to flush a packet based on a packet acknowledgment; and
   responsive to said determining, flushing a packet and removing one or more data structures from the linked list of data structures.

4. The method of flushing packets of claim 1, the method further comprising:
   determining whether to flush a packet responsive to expiry of a flush timeout timer; and
   responsive to said determining, flushing a packet and removing one or more data structures from the linked list of data structures.

5. The method of flushing packets of claim 1, where the master and slave wireless communications devices communicate via a short-range wireless communications protocol low-energy connected isochronous stream (CIS).

6. The method of flushing packets of claim 5, where the short-range wireless communications protocol is Bluetooth®.

7. A system comprising:
   a master wireless communication device;
   a slave wireless communication device operatively coupled to the master wireless communications device; and
   one or more processors coupled to non-transitory memory storing machine executable program instructions that when executed by the one or more processors, cause at least one of the master wireless communications device and the slave wireless communications device to:
   responsive to a packet in a packet queue, and prior to an anchor point, generate a data structure of the anchor point, the data structure having at least one flush timeout parameter;
   add the data structure to a linked list of data structures; and
   responsive to a receiving operation at at least one of the master and slave wireless communications devices, flush a packet based at least in part on a content of at least one data structure in the linked list of data structures.

8. The system for flushing packets of claim 7, where the content of the at least one data structure includes one or more of a burst number and a sub-event counter.

9. The system for flushing packets of claim 7, where after the receiving operation at at least one of the master and slave wireless communications devices, the one or more processors are operable to determine whether to flush a packet based on a packet acknowledgment; and
   responsive to said determine, flush a packet and remove one or more data structures from the linked list of data structures.

10. The system for flushing packets of claim 7, where the one or more processors are operable to:
    determine whether to flush a packet responsive to expiry of a flush timeout timer; and
    responsive to said determine, flush a packet and remove one or more data structures from the linked list of data structures.

11. The system for flushing packets of claim 7, where the master and slave wireless communications devices communicate via a short-range wireless communications protocol low-energy connected isochronous stream (CIS).

12. The system for flushing packets of claim 11, where the short-range wireless communications protocol is Bluetooth®.

13. A computer program product for flushing packets between a master wireless communications device and a slave wireless communication device, the computer program product comprising:
    a non-transitory memory medium, the memory medium containing machine executable program instructions executable by one or more processors, the program instructions including:
    program code, which when executed by the one or more processors, causes the one or more processors, responsive to a packet in a packet queue, and prior to an anchor point, to generate a data structure of the anchor point, the data structure having at least one flush timeout parameter;
    program code, which when executed by the one or more processors, causes the one or more processors to add the data structure to a linked list of data structures; and
    program code, which when executed by the one or more processors, causes the one or more processors, responsive to a receiving operation at at least one of the master and slave wireless communications devices, to flush a packet based at least in part on a content of at least one data structure in the linked list of data structures.

14. The computer program product for flushing packets of claim 13, where the content of the at least one data structure includes one or more of a burst number and a sub-event counter.

15. The computer program product for flushing packets of claim 13, where, responsive to the receiving operation at at least one of the master and slave wireless communications devices, the program code causes the one or more processors to:
 determine whether to flush a packet based on a packet acknowledgment; and
 responsive to said determine, flush a packet and remove one or more data structures from the linked list of data structures.

16. The computer program product for flushing packets of claim 13, where the program code causes the one or more processors to:
 determine whether to flush a packet responsive to expiry of a flush timeout timer; and
 responsive to said determine, flush a packet and remove one or more data structures from the linked list of data structures.

17. The computer program product of claim 13, where the master and slave wireless communications devices communicate via a short-range wireless communications protocol low-energy connected isochronous stream (CIS).

18. The computer program product of claim 17, where the short-range wireless communications protocol is Bluetooth®.

* * * * *